United States Patent
Prudham et al.

(10) Patent No.: US 7,644,635 B2
(45) Date of Patent: Jan. 12, 2010

(54) POSITION SENSOR WHICH IS INTENDED, IN PARTICULAR, FOR MEASURING STEERING COLUMN TORSION

(75) Inventors: Daniel Prudham, Thise (FR); Gerald Masson, Besancon (FR); Antoine Foucaut, Montarlot-les-Rioz (FR)

(73) Assignee: Moving Magnet Technologies, Besancon (FR)

( * ) Notice: Subject to any disclaimer, the term of this patent is extended or adjusted under 35 U.S.C. 154(b) by 99 days.

(21) Appl. No.: 11/631,850

(22) PCT Filed: Jul. 11, 2005

(86) PCT No.: PCT/FR2005/050571

§ 371 (c)(1),
(2), (4) Date: Aug. 23, 2007

(87) PCT Pub. No.: WO2006/008425

PCT Pub. Date: Jan. 26, 2006

(65) Prior Publication Data

US 2008/0250873 A1    Oct. 16, 2008

(30) Foreign Application Priority Data

Jul. 9, 2004    (FR)    ................................. 04 07718

(51) Int. Cl.
*G01L 3/02*    (2006.01)
(52) U.S. Cl. .......................... 73/862.334; 73/862.331
(58) Field of Classification Search ...........................
73/862.331–862.334
See application file for complete search history.

(56) References Cited

U.S. PATENT DOCUMENTS

| 6,868,744 | B2 * | 3/2005 | Sugimura et al. | ...... 73/862.333 |
| 6,928,887 | B2 * | 8/2005 | Nakane et al. | ......... 73/862.331 |
| 7,051,602 | B2 * | 5/2006 | Nakane et al. | ......... 73/862.333 |
| 7,089,809 | B2 * | 8/2006 | Nakane et al. | ......... 73/862.331 |
| 2003/0167857 | A1 * | 9/2003 | Sugimura et al. | ...... 73/862.333 |
| 2004/0074314 | A1 | 4/2004 | Nakane et al. | |

FOREIGN PATENT DOCUMENTS

DE    203 05 732    8/2003
GB    2 379 277    3/2003

OTHER PUBLICATIONS

U.S. Appl. No. 12/159,901, filed Sep. 4, 2008, Masson, et al.

* cited by examiner

*Primary Examiner*—Max Noori
(74) *Attorney, Agent, or Firm*—Oblon, Spivak, McClelland, Maier & Neustadt, L.L.P.

(57) ABSTRACT

The invention relates to a position sensor which is intended, in particular, for detecting a steering column torsion. The invention consists of: a first magnetic rotor structure (10) comprising a plurality of radially-oriented magnets; a second stator structure comprising two rings (23, 24) which extend into axially-oriented overlapping teeth (25, 26); and a third fixed collector structure (30) comprising two flux-closing parts which define at least one air gap in which at least one magneto-sensitive element is placed. The invention is characterized in that the flux-closing parts and the stator rings (23, 24) define therebetween a constant collection surface that is independent of the relative radial position of the two structures.

12 Claims, 7 Drawing Sheets

POSITION SENSOR WHICH IS INTENDED, IN PARTICULAR, FOR MEASURING STEERING COLUMN TORSION

The present invention relates to the field of position sensors, and more particularly position sensors used for measuring the torsion of a steering column, without this application being exclusive.

In the state of the art, the American patent U.S. Pat. No. 4,984,474 is known, describing a sensor of the state of the art, having a stator part consisting of a ferromagnetic piece forming radial teeth, on two stages, placed opposite multi-pole magnets magnetized radially in alternate directions.

An additional ferromagnetic piece is placed opposite the stator part and has a gap in which a Hall probe is arranged.

This solution of the prior art is not satisfactory because it leads to a loss of magnetic signal between the stator part and the part including the Hall probe. Furthermore, the magnetic field generated by the magnets gives rise to losses due to the sensor structure.

A sensor described in French patent FR 2824910 is also known in the state of the art, describing another position sensor consisting of a part having a plurality of magnets cooperating with the axially oriented teeth of a stator part consisting of two support assemblies of annular shape.

This structure leads to problems of non-linearity of the output signal due to the shape of the stator teeth, which have tapered ends.

Lastly is known in the state of the art, the international patent WO 02/071019.

This solution, which is more satisfactory than the preceding ones because of its optimized structure, produces an appropriate signal-to-noise ratio to perform a reliable measurement.

Nevertheless, to ensure good operation of the sensor, that is, not very sensitive to the geometric or dimensional variations of its constituent parts, the gaps used in the magnetic circuit have to be increased.

While these gaps make it possible to accept the dispersions inherent to mass production, the sensor sensitivity, defined by the output signal to the measured angle ratio, diminishes greatly and no longer allows reliable measurements on short strokes (less than ±6°).

Thus this fourth solution, without taking other dimensioning precautions than those described in the text of patent WO 02/071019, does not provide a sufficient signal for meeting all needs regarding torque measurement on a torsion shaft, assuming that the strokes are generally between ±3° and ±8°.

Lastly, keeping to the description of the sensor structures as described in the aforementioned patents, the induction level in the stator teeth is high, so that it is necessary to use a large tooth thickness, that is, between 1.5 and 2 mm, in order to avoid magnetic saturation of the material.

Yet it appears that the thickness of the plate sheet used for making the stator part is a major parameter in the sensor design. In fact, it determines the leaks occurring between the flanks of the stator teeth.

Thus, our experimental work has shown that the reduction of this thickness also reduces these leaks, which results in an increase of the sensor sensitivity.

As explained above, this sensitivity is lacking on short stroke sensors, and thus being able to reduce this tooth thickness to ensure sufficient sensitivity allowing the sensor to operate over short strokes is very important.

It can thus be understood that the existing solutions are limited, on the one hand by a lack of sensitivity that is penalizing for short strokes, and on the other hand by the impossibility to reduce the teeth thickness because of a high induction level.

In addition to the technical aspect of this teeth thickness criterion, it is also important to note that making sensors with solid teeth induces a major increase in the manufacturing costs of the sensor.

As a matter of fact, the materials having the necessary qualities for manufacturing these magnetic parts are relatively expensive. The material cost can account for 40 to 60 percent of the total manufacturing cost of these parts.

Reducing the volume of material used is thus primordial in attempting to reduce costs.

Having in mind that these angle sensors are mainly aimed at the automotive field and that the manufacturing cost is very important in this field, it appears that this thickness of magnetic parts criterion can lead to an incompatibility with the target market of measuring the torque on a steering column.

The purpose of the present invention is thus to remedy the two main problems identified on the existing structures, which are the low sensitivity of the sensor and the use of solid and thus expensive parts.

To this end, the new sensor consists of three distinct magnetic structures: The first one is a rotor structure including a plurality of magnets fixed on a support assembly; the second one is a magnetic stator structure including two rings with a plurality of imbricated axial teeth; and the third one is a fixed collector structure consisting of two portions of disk extended by bent branches that close to form a measurement gap where a magneto-sensitive element is placed.

The relative rotation of the first two structures generates a flux variation in the gap created at the level of the third collector structure.

The stator structure is characterized by a precise dimensioning of the geometry of the stator teeth.

This dimensioning allows better performance in terms of signal level, linearity, sensitivity to geometric and dimensional defects, thanks to the reduction in the thickness of the magnetic parts.

The various geometric criteria covered by the present invention will be stated in the following paragraphs.

A simulation analysis in 3D of the magnetic configuration as defined in patent WO 02/071019 brings out a major leakage flux between the end of the teeth of one stator and the ring of the other stator.

Thus, it appears that the length of the stator teeth is a very important parameter for regulating the fluxes in this type of magnetic structure.

Thus, the imbrication length of the teeth must be limited, or else leakage fluxes appear at the ends of the teeth and induce a high level of induction, which requires keeping a large teeth thickness, which in turn induces leakage between the teeth flanks.

It will be noted that the width of the stator teeth is also important for ensuring good sensor linearity. This width can be defined by an angle that must be greater than the target stroke for the sensor.

Moreover, it is advantageous to give these teeth a trapezoidal shape to increase the available section for the passage of the flux when approaching the tooth bending, since at this level the flux is maximum.

It should be added that the active surface of the tooth, that is, the surface facing the magnet, determines the quantity of flux collected and thus the sensor sensitivity.

This surface thus has to be chosen as large as possible while remaining compatible with the other parameters.

As a result, we can thus establish that the optimization of the stator structure requires minimizing the surfaces facing each other on the opposite stator teeth flanks to limit the leaks, and maximizing the teeth areas facing the magnet.

Thus, the dimensioning rule governing the dimensioning of the stators can be expressed as a ratio of the stated surfaces and defined by:

$$\frac{\text{Teeth height} \times \text{Average teeth width}}{\text{Teeth imbrication height} \times \text{Teeth thickness}} > 5$$

where the average teeth width is defined as the average value of the lengths of arcs formed at the end and at the base of the teeth.

Referring to FIGS. 2a and 2c of the French patent FR 2824910, it is possible to evaluate roughly the above geometric criterion and the obtained value is between two and three. The same applies for the American patent U.S. Pat. No. 4,984,474: this value is between one and two.

For the other known patents, the sensor architecture is fundamentally different and does not allow an evaluation of this criterion.

In addition to this dimensioning of the stator geometry, the length of the magnet must also be optimized with respect to the overall height of the sensor.

As a matter of fact, it appears that the sensor sensitivity compared to the magnet volume is optimum when the magnet length corresponds substantially to the teeth length, which is defined by the rule stated above.

When these rules are applied, the leakage fluxes between the teeth are limited and the level of induction in the tooth is reduced proportionally. It is then possible to reduce the teeth thickness, which leads to a better sensor sensitivity.

As an indication, the above geometric specifications make it possible to divide the teeth thickness by a factor of two or more with respect to the thickness required in the base configurations such as described in the previous art.

Aside from the preceding criteria concerning the stator geometry, the choices made in the sensor collector structure configuration can also improve the sensor sensitivity and help reducing costs.

Thus the sensor according to the invention uses collectors that are like angular sectors of thin disks, which allow an axial collection of the flux and exhibit a well pronounced bending between the flux exchange surface with the stator and the other end of the branch that defines the measurement gap.

This configuration makes it possible to manufacture thin collectors, which offers the advantage of limiting the leaks occurring on the edges of the flux conduction branches in the gap and thereby increases the sensor sensitivity.

We can then define a second geometric criterion as being the ratio of the measurement gap to the inter-stator axial distance.

The new collector structure (30) such as described in this patent has a small measurement gap compared with the distance separating the two stator rings and is characterized by the following equation:

$$\frac{\text{Inter-stator distance}}{\text{Gap height}} \geq 4$$

It is noted that no patent of the previous art describes such an axial collector structure having this dimensional characteristic.

Furthermore, the possibility of using thin collectors makes it possible, in our case, to manufacture both stators and both collectors out of one and the same strip of material.

This particular feature once again allows a reduction in manufacturing costs of the magnetic parts by limiting the losses of material, thanks to a judicious arrangement of cut-outs in the strip.

According to the various descriptions of the previous art, these collecting parts can have different shapes and positions with respect to the stators. They are described as being located inside the stators or simply in their vicinity, depending on the existing patents.

Beyond the general shape to be given to the collectors, we propose in this text a new solution concerning the position of the angular collecting sectors with respect to the stators, which sharply increases the sensor sensitivity.

It consists in placing the collectors outside the stators, so that they are as far as possible from each other while still facing the stator disks.

As a matter of fact, considering the leakage fluxes that circulate between the two collectors without passing through the measurement gap, this type of collecting leads to an improvement in the sensor sensitivity and participates in the definition of the optimized sensor claimed in the present patent.

Moreover, for reasons of reliability of the torque sensor, it can be advantageous to provide two magneto-sensitive elements to allow measurement redundancy in case of failure of one of the probes.

To this end, the flux collectors can have two distinct branches creating two measurement gaps in parallel, where the two separate magneto-sensitive elements are placed.

Knowing that more advanced electronic components exist today, which contain two magneto-sensitive elements in a single integrated circuit, it is advantageous to use collectors that each have a single branch, so as to take advantage from the measurement redundancy while limiting the measurement gap area.

As a matter of fact, the reduction of the facing area on the two collectors increases the signal level and thus the sensitivity of the sensor.

Returning to the collector structure, it is important to note that the angular collecting sectors are fixed while the stators are moveable in rotation and can thus have a round bottom, which results in a radial offset between both structures.

In order to ensure the sensor insensitivity to this excentration defect, the angular collecting sectors must be so designed as to be able to collect a constant axial flux despite any radial offset between both stator and collector structures.

This is possible as long as the permeance, that is, the physical quantity that represents the ease with which the flux can pass through this stator collector gap, is independent of the relative radial position of both structures.

The permeance relative to a gap between two ferromagnetic parts is defined by the following relation:

$$\Lambda = \frac{\mu \times S}{\lambda}$$

where:

μ is a characteristic constant of the material making up the gap and is called magnetic permittivity;

S is the area of the surface over which the two parts are facing each other;

λ is the distance between both surfaces facing each other and making up the gap.

Knowing that the gap distance is not affected by the radial offset between stator and collector structures, it is sufficient to ensure a constant facing surface to maintain a fixed permeance.

In this text, we claim a special shape given to the stator rings (23, 24) and to the angular collecting sectors (33, 34), that makes it possible to obtain an overlapping of one of the parts over the other in order to make the sensor insensitive to the radial offset between the stator (20) and collector (30) structures.

As will be explained in greater details in the following paragraphs, the angular sectors can be dimensioned with a radial disk width that is smaller than that of the stator rings, and conversely when the stators have a well-delimited collecting ring, the angular sectors will be designed to be able to overlap these stator rings.

The various specific features of the optimized angle sensor will be brought out more clearly through the description of following figures:

FIGS. 1 and 2 are perspective views showing the new sensor collector structure;

FIGS. 3 and 4 are a flat view and a perspective view respectively showing the claimed geometric criteria on the stator part;

FIGS. 5, 6 and 7 represent a first embodiment of the sensor;

FIGS. 8 and 9 represent a second embodiment of the proposed solution;

FIGS. 10 and 11 are perspective views presenting a particular embodiment of the collector structure based on collecting external to the stators;

FIGS. 12 and 13 represent a variant of the solution presented in FIGS. 10 and 11;

FIGS. 14, 15 and 16 are, respectively, a perspective view, a perspective cross section and a top view, presenting a particular shape used for the stators and collectors at the level of the flux exchange surfaces;

FIGS. 17 and 18 present an embodiment in which the stator teeth are as shortened as possible, so that the imbrication of the teeth is null;

FIGS. 19 and 20 present an embodiment of the collector part.

Figure 1:
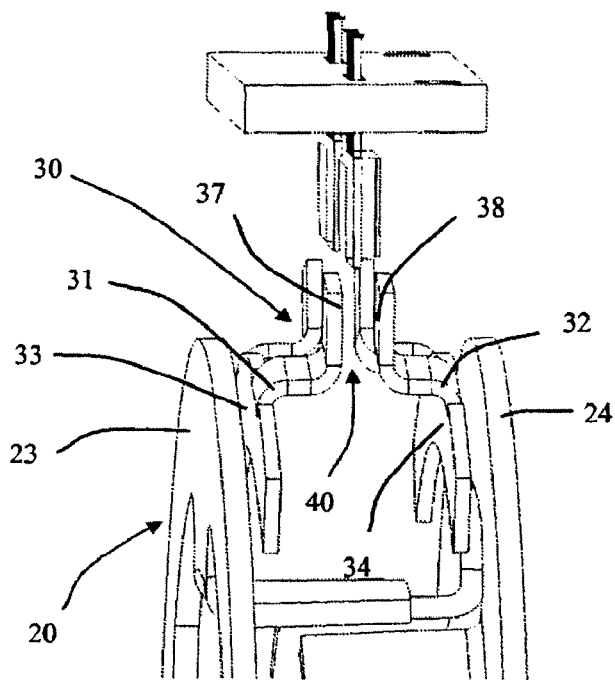
FIGS. 1 and 2 are views that represent the third magnetic structure of the sensor. The fixed collector structure (30) collects the flux on the stator rings (23, 24) and concentrates it in the measurement gap (40).
Figure 2:
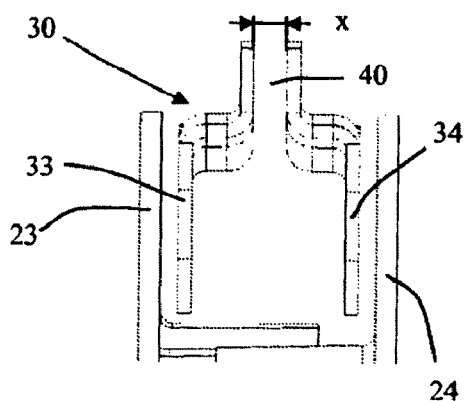

This structure consists of two pieces (31, 32), each formed by an angular disk portion (33, 34), which is designed to be able to generate flux exchange between stators and collectors in the axial direction of the sensor.

Collectors (31, 32) have angular sectors (33, 34) whose radial width is smaller than that of the stator rings (23, 24) and make it possible to tolerate an excentration defect between the stator structure (20) and the collector structure (30).

Collector pieces (31, 32) have a large offset between the disk portions (33, 34) and the facets (37, 38) making up the measurement gap (40).

This particular feature makes it possible to limit the flux leaks between the collector parts (33, 34), which remain far from one another, and to keep a gap (40) with a reduced width (x) to concentrate the flux as much as possible and increase the sensor sensitivity.

Finally, the magnetic collecting structure is different from the previous art in that the angular collecting sectors (33, 34) are designed to be capable of operating an axial flux transfer, that they are totally within the stator rings (23, 24) in order to obtain a permeance that is independent of the relative radial position of the two structures (20) and (30), and that they have a marked bending generating a major offset between angular sectors (33, 34) and the faces (37, 38) forming the measurement gap (40).

Figure 3:
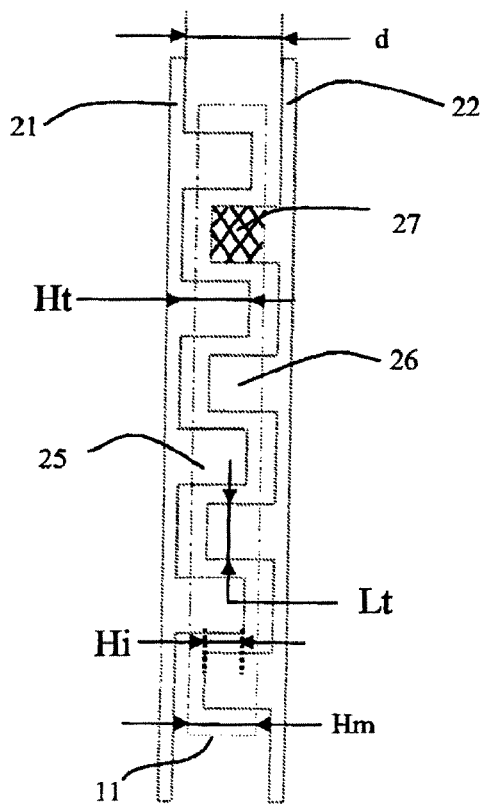

FIG. 3 is a diagram corresponding to a flat rolled-out view of magnet (11) as well as of the two stators (21, 22) including imbricated axial teeth (25, 26).

This diagram shows that the teeth do not extend as far as the second stator and that their width (Lt) is close to their length (Ht).

These specific geometric features make it possible to reduce the teeth thickness as well as that of the collectors, to achieve a high-performance low-cost sensor.

Figure 4:
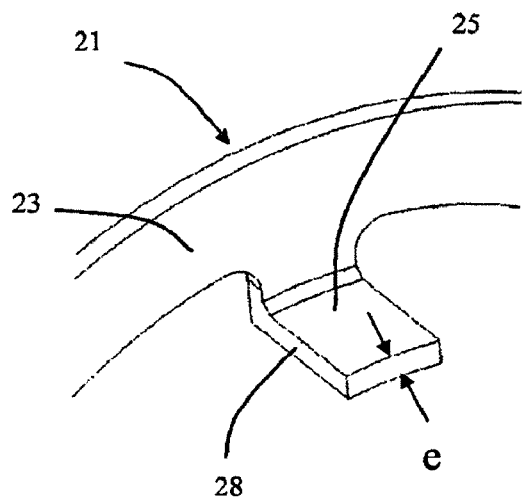

FIG. 4, combined with FIG. 3, shows a perspective view of a stator tooth (25) so as to show the thickness of the teeth (e) and the lateral area of the teeth (28) which is discussed in the following paragraphs.

In the configuration as represented in these two FIGS. 3 and 4, it appears that the ratio of the useful tooth area (27) facing the magnet (11) to the lateral area of leakage between teeth (28) is large and verifies the relation expressed in the sections above, that is, a ratio greater than five.

It will be noted that the height Hm of the magnet (11) is roughly equal to the height Ht of the teeth (25, 26) and thus much less than the inter-stator distance denoted (d).

This view brings out the various geometric parameters to be taken into account in dimensioning the stators.

We denote:

Ht: the height of the stator teeth, from the end up to the inner surface of the ring;

Hi: the height over which the stators interpenetrate each other, or the teeth imbrication height;

Hm: the height of the magnet along its axis;

Lt: the average teeth width calculated as the average value of the lengths of the arcs formed at the teeth end and at the base;

e: the thickness of the teeth in the radial direction to the stator.

These parameters are used to define a ratio between the active surface and the leaking surface of the teeth, a ratio that is used to define a characteristic relation of the proposed sensor.

Figure 5:
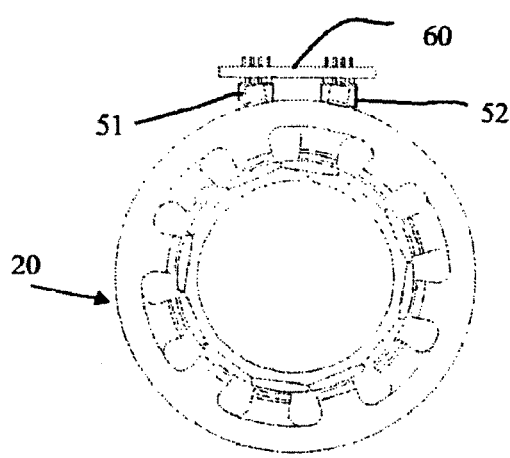
Figure 6:
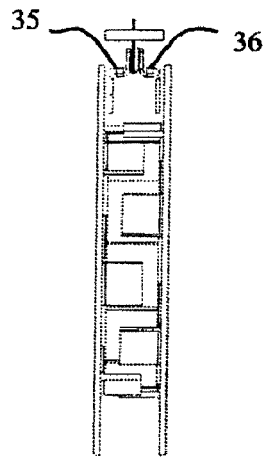
Figure 7:
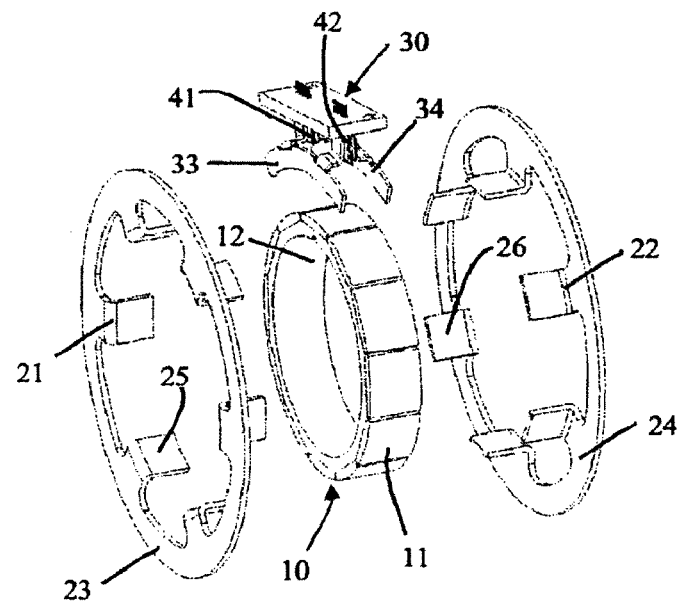

FIGS. 5, 6 and 7 are, respectively, face, side and perspective views representing a first embodiment of the sensor according to the invention, the stator part (20) meets the geometric rules stated above and the collector structure (30) shows the angular sectors (33, 34) facing the stator rings (23, 24) in an axial direction.

The rotor structure (10) includes a magnet (11) with six pairs of poles mounted on a cylinder support assembly (12) acting on two stators (21, 22) each including six straight teeth (25, 26).

The imbrication height of the stators (21, 22) is small compared to the length of the teeth (25, 26) and their width is large compared to their thickness. The geometric criteria relative to the dimensioning of the stators are thus met.

This view also presents a first flux collecting solution based on two angular disk sectors (33, 34) within the stator rings (33, 34) and extended by two folded branches (35, 36) which return the flux within two measurement gaps (41, 42) in which two Hall probes (51, 52) are placed, soldered on a printed circuit (60) to benefit from a measurement redundancy.

Figure 8:
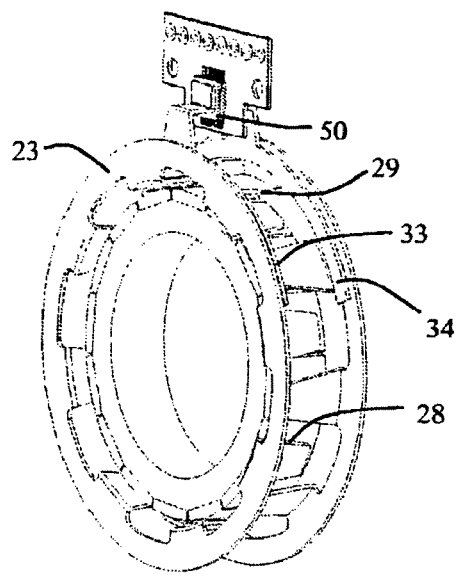
Figure 9:
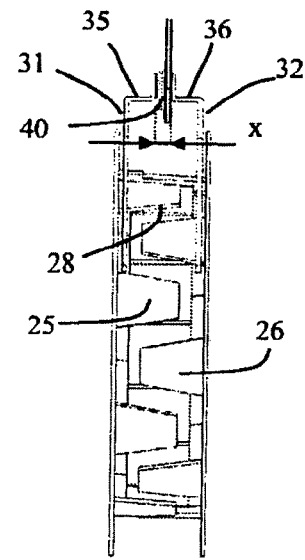

FIGS. 8 and 9 represent a second embodiment of the proposed solution, in which a structure with eight teeth appears, which is more appropriate for measurements over a short stroke (±4°).

The teeth (25, 26) are of trapezoidal shape so as to increase the section at the tooth root. This trapezoidal shape is particularly advantageous in the case of our optimized design.

As a matter of fact, as the teeth thickness is voluntarily very reduced, this broadening makes it possible to keep a sufficient section for the passage of the flux, to avoid saturation in the tooth root.

Moreover, shortening the teeth makes it possible to execute this broadening at the tooth base without generating parasitic leaks between the lateral flanks (28, 29) of opposite teeth.

Also, the multi-pole magnet (11) is dimensioned to have a height close to that of the teeth (25, 26), thus offering a better compromise between sensor sensitivity and the magnet volume.

As in the previous figure, the flux collector pieces (31, 32) are placed inside the stator rings (23, 24) and have the shape of circular sectors (33, 34) extended by folded branches (35, 36), closing together to form a measurement gap (40).

This construction differs from the preceding one in that the collectors (31, 32), which have only one branch (35, 36) each, conduct the flux into a single measurement gap (40), designed to be able to receive a single electronic component (50) which integrates two magneto-sensitive elements so as to maintain measurement redundancy.

It will be noted, however, that in this case the height x of the measurement gap (40) has to be increased because this gap must contain the component as well as the support circuit. This gap increase has the disadvantage of reducing the sensor sensitivity, but on the other hand it reduces the costs of the electronic components.

Figure 10:
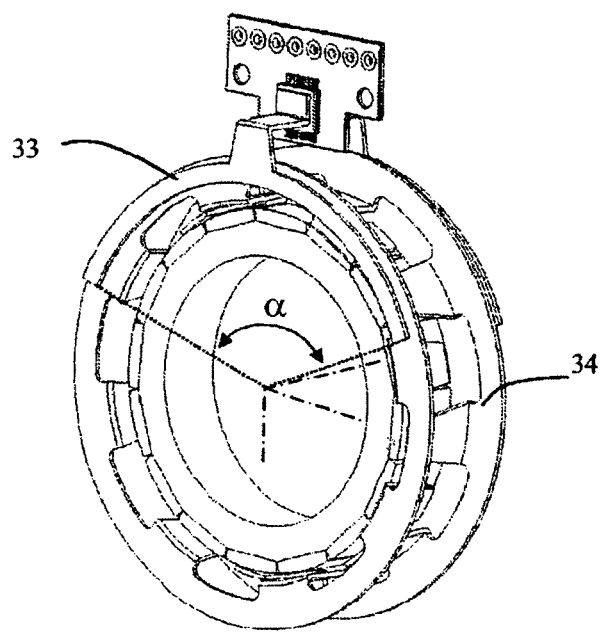
Figure 11:
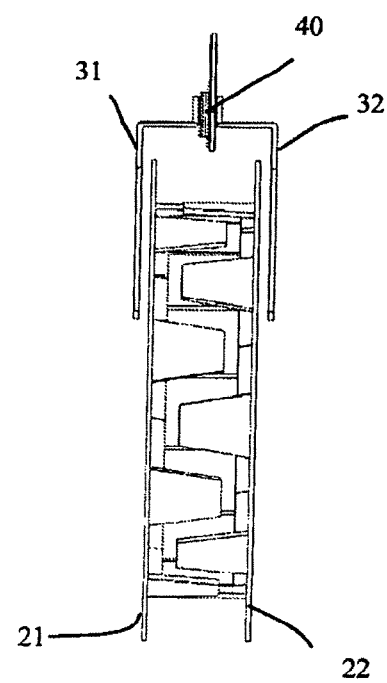

FIGS. 10 and 11 show a construction mode in which the angular sectors (33, 34) of the flux collecting pieces (31, 32) are placed outside the stators (21, 22).

This outside localization improves the sensor sensitivity by limiting the leaks appearing between the two disk portions (33) and (34), to further concentrate the flux in the measurement gap (40).

The angle α in FIG. 10 corresponds to the angular width of the inner edge of the collecting sectors (33, 34). This angle will preferably be chosen as a multiple of the magnet angular polar pitch.

Figure 12:
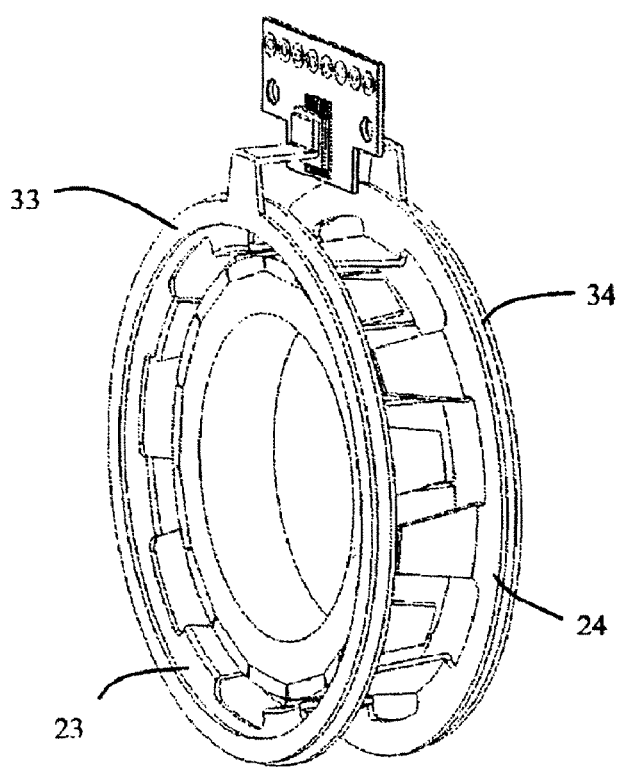
Figure 13:
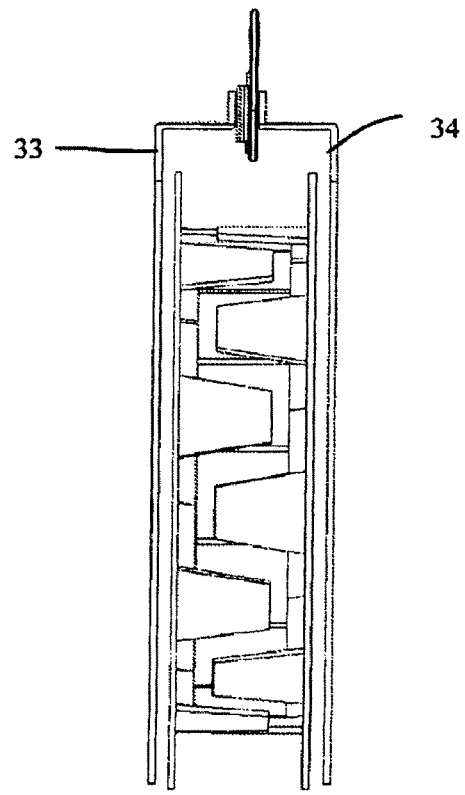

In the case of the solution of FIGS. 10 and 11, the collecting is carried out over a limited angular sector, whereas FIGS. 12 and 13 present a variant solution in which the flux collector parts (33, 34) consist of a complete disk.

This solution firstly offers a gain in the quantity of collected flux, which results in a sensor sensitivity gain, and also has an advantage relative to the sensor tolerance for the axial deflection defects of the stators (23, 24), which can then be manufactured with geometric tolerances that are not as tight, and therefore at lower cost.

Figure 14:
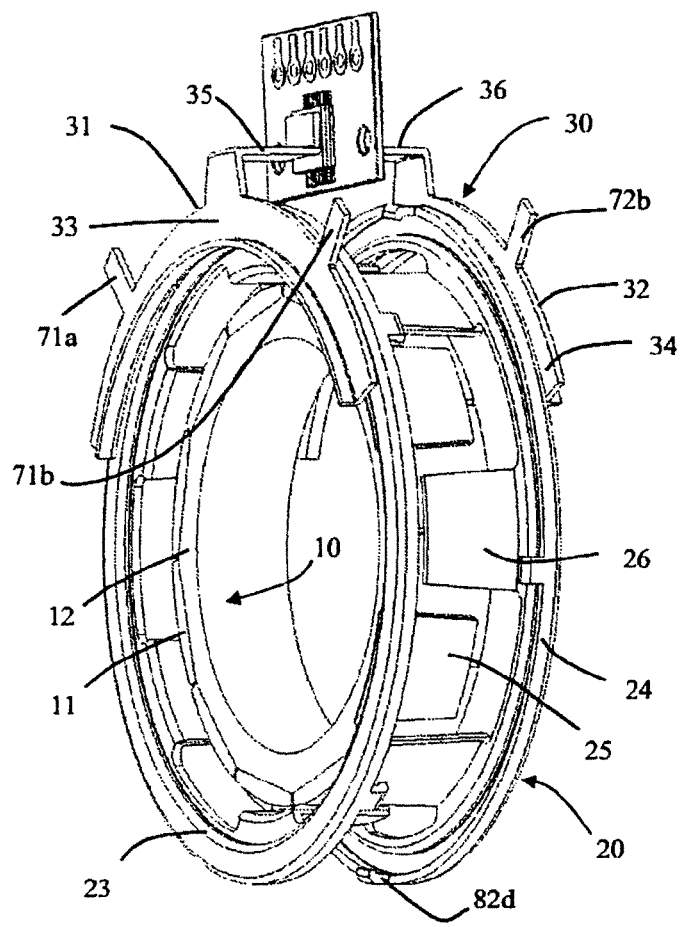
Figure 15:
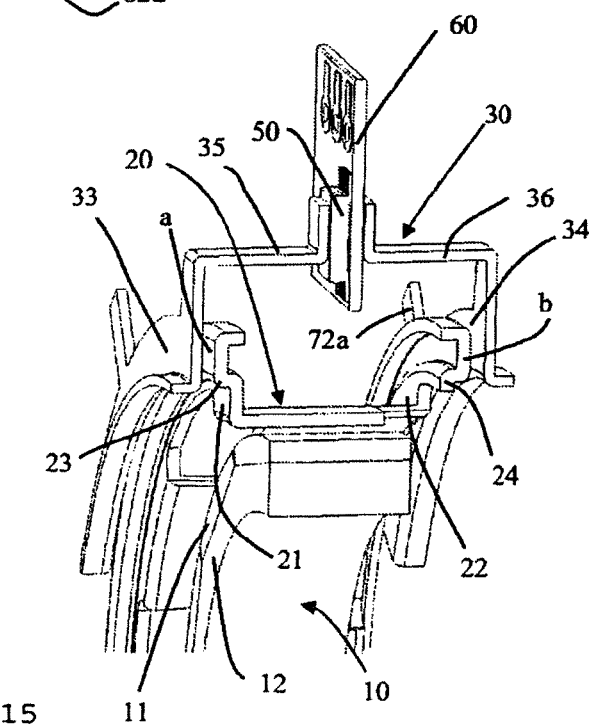
Figure 16:
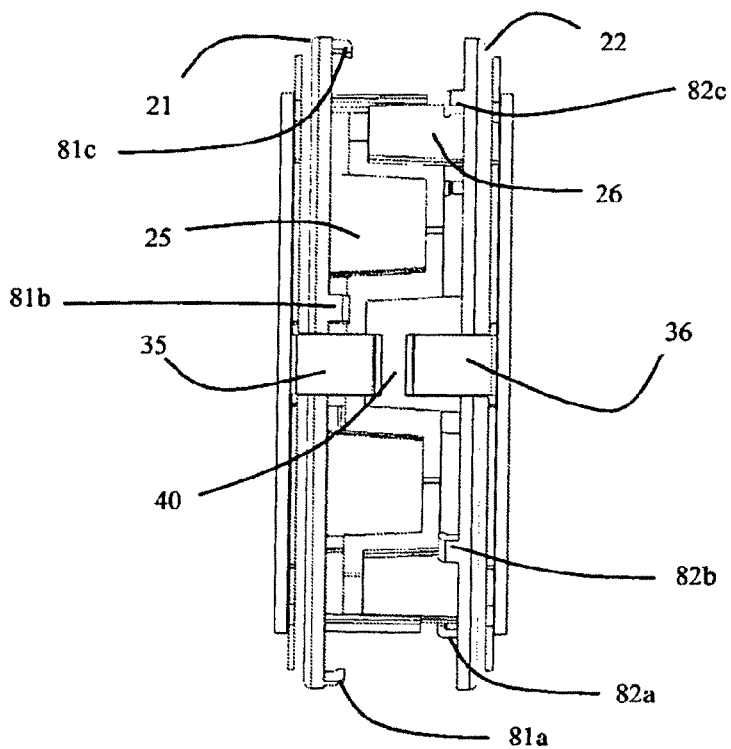

FIGS. 14, 15 and 16 are, respectively, a perspective view, a perspective section view and a top view showing a preferred embodiment for the sensor.

Using this particular embodiment, we will describe precisely the shapes and dimensions of a sensor dimensioned to make a measurement of a stroke of plus or minus eight degrees of a torsion shaft equipping a steering column.

The sensor still consists of the three structures, collector (30), stator (20) and rotor (10), the latter consisting of a magnet with six pole pairs (11) 7 mm high, magnetized radially to form a ring with an inner diameter of 34.8 mm and an outer diameter of 37.8 mm, mounted on a cylinder support assembly (12) having the same height as the magnet and with an inner diameter of 31 mm.

The stator structure (20) includes two stators (21, 22) mounted facing each other and shifted by an angle corresponding to the polar pitch of the magnet, which is thirty degrees.

Each of these stators consists of a circular ring (23, 24) with an inner diameter of 39.2 mm and an outer diameter 49 mm extended on its inner part by six teeth (25, 26) formed as portions of a 7 mm high cylinder, oriented axially so as to cooperate with the outer faces of the magnets making up the first rotor structure (10).

The teeth show an angular width, viewed from the sensor axis, that increases from 23 degrees at the end to 26 degrees at the foot, so as to increase the flux passage section in the tooth root, whereby the thickness of the plate sheet used is 0.6 mm.

It will also be noted that the angular with of the interior arc of the tooth, viewed from the stator axis, is 23° compared to the 16° of stroke, so this tooth geometry differs from the prior art by a large width but a small length and thickness.

Both stators (21, 22) are imbricated over a distance of 4.25 mm so that the inter-stator distance between both rings (23, 34) is 9.75 mm.

In this embodiment, the stator rings differ from the previous descriptions by an additional shape obtained by stamping in the axial direction of the sensor.

The rings then exhibit a U section and benefit from a flat toric portion shifted 0.8 mm in the direction opposite to the magnet.

These flat toruses (a, b) are then able to transmit the flux from the magnets (11) to the angular sectors (33, 34) that constitute the collector structure (30) and which they face through a gap of 0.7 mm.

The U-shaped stamped portion on the stator rings has two distinct advantages:

Firstly, it shows the surfaces (a, b) shifted with respect to the tooth departures, these surfaces allowing a regular flux exchange around the edge with collectors (31, 32) without defects as the teeth are passed by.

Secondly, it stiffens the rings and in particular the surfaces (a, b) and thus improves the precision of the collecting system.

Moreover, the angular sectors (33, 34) are dimensioned in such a way as to overlap the toric portions (a, b) of the collector rings (23, 24) and this overlapping ensures the insensitivity of the sensor to the run out of the stator part (20) as explained above.

Of course, this insensitivity to the run out is true below a certain limit of radial offset of the two structures.

This limit is defined by the difference of the inner diameter of 44 mm and outer diameter of 49 mm of the toruses (a, b) compared to the inner diameter of 43 mm and outer diameter of 50 mm of the angular sectors (33, 34).

This dimensioning thus leads to an insensitivity of the radial offset of the stator structure (20) with respect to the collector structure (30) as long as this remains less than 0.5 mm in terms of radius.

The angular sectors (33, 34) also have a stamped portion over a height of 1 mm, formed axially in the direction opposite the magnet, which stiffens the collectors (31, 32) made out of a plate 0.6 mm in thickness with a material that is soft because it has undergone a magnetic annealing treatment.

Two branches (35, 36) which are 4.5 mm wide extend the angular sectors (33, 34) and are used to close the flux in a measurement gap (40) 1.75 mm in height located radially outside the stators (21, 22) and in which a magneto-sensitive element (50) is placed and held by a printed circuit (60).

In this particular case, the collecting is performed outside the stator rings to increase the sensor sensitivity, which requires a higher sensor than in the case of interior collecting but offers a gain of about twenty percent in sensor sensitivity.

Considering the stamped portions executed on the stator rings (33, 34) and the exterior collecting, the total height of this sensor is 17 mm, this dimension being measured on the external faces of the folds executed on the collecting angular sectors (33, 34)

Each collecting angular sector (33, 34) is fitted with two radial blades (71a, 71b) and (72a, 72b) positioned to either side of the conducting branches (35, 36), which do not have magnetic functions but are used for mechanical fixation of the collecting pieces in their support.

In the same way, four bent blades (81a, 81b, 81c, 81d) and (82a, 82b, 82c, 82d) are distributed around the periphery of each ring of stators and folded down toward the inside in order to fix the stators mechanically on a spacer piece acting as support for the stator part (20).

Returning to the collector structure (30), it will be noted that the angular sectors extend over an angle of 135°, or six times 22.5° corresponding to the polar pitch of the rotor (10) with 8 pairs of poles.

As a matter of fact, the angle of these sectors is chosen as a multiple of the polar angular width of the magnet, so that when one magnet pole approaches the vicinity of the collecting angular sectors (33, 34), another magnet pole moves away.

Thus the rotation of the rotor structure (10) becomes invisible to the collector part (30).

This singularity reduces the signal undulation defects of the sensor when the rotor (10) and stator (20) structures turn by the same angle, that is, when the steering column rotates without any torque variation.

Figure 17:
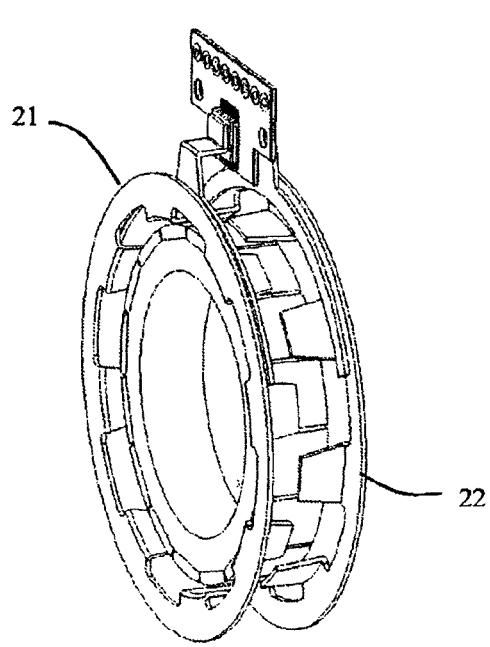
Figure 18:
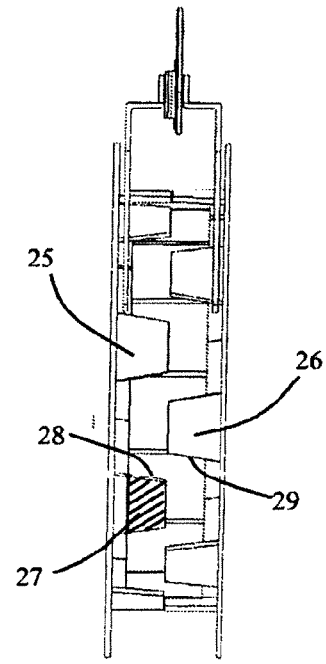

FIGS. 17 and 18 represent an extreme embodiment of the sensor in which the stator teeth (25, 26) have been shortened as much as possible so that there is no longer any imbrication of both stators (21, 22).

In this case, the leaks through the lateral surfaces (28, 29) of the teeth are very small, which lowers the level of induction in the teeth and improves signal linearity. Nevertheless, as the surface of the stator teeth facing the magnet (27) is small, it is clear that this type of solution leads to a limited sensor sensitivity.

Nevertheless, if the priority is to ensure good linearity without trying to optimize the level of the sensor signal with respect to the magnet volume, this solution may have a certain advantage.

Figure 19:
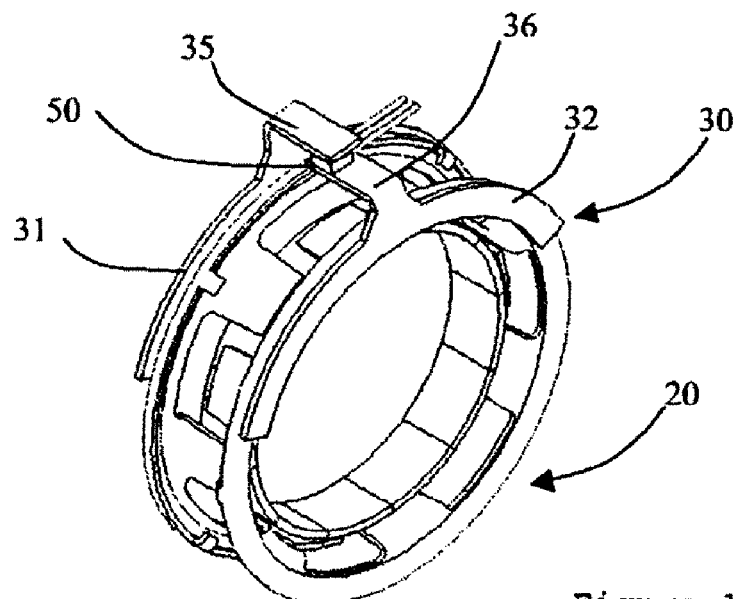
Figure 20:
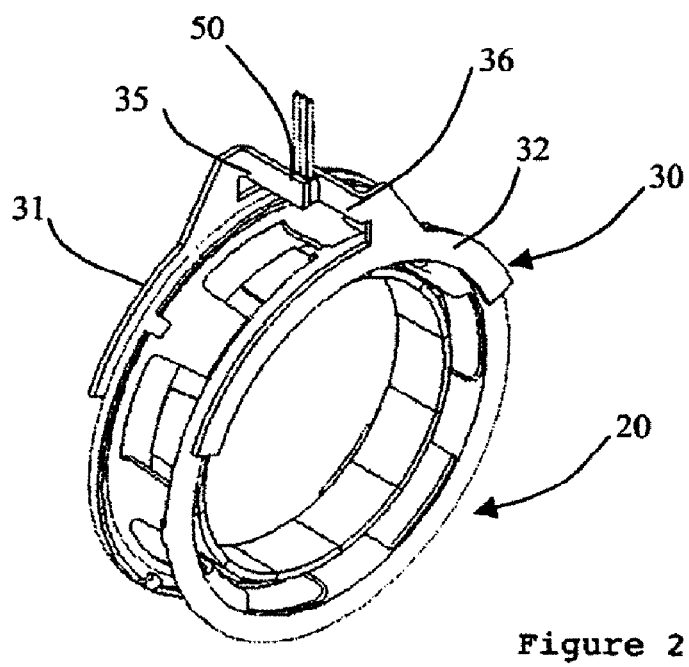

FIGS. 19 and 20 show construction variants of the collector part (30) in which the branches (35, 36) of the flux closing parts (31, 32) are straight, oriented axially without folds. These constructions allow greater freedom in the axial positioning of the electronic component (50), which thus becomes less sensitive to mechanical errors and tolerances of axial positioning.

In FIG. 19, these branches (35, 36) are oriented axially and provide a radial overlapping of one over the other with respect to the stator structure (20). The electronic component (50) must then be inserted so that the detection axes of the magneto-sensitive elements are radial with respect to the stator structure (20). This configuration offers greater freedom in the axial positioning of the electronic component (50).

In FIG. 20, these branches (35, 36) are oriented axially and provide a tangential overlapping of one over the other with respect to the stator structure (20). The electronic component (50) must then be inserted so that the detection axes of the magneto-sensitive elements are in parallel tangent axes with respect to the stator structure (20). This configuration allows greater freedom in the axial positioning of the electronic component (50) and makes it possible to manufacture the collector part (30) in a cutout piece having a smaller diameter than in the other configurations, which is an advantage in terms of total cost of the sensor.

The invention claimed is:

1. A position sensor configured to detect torsion of a steering column, comprising:
 a first magnetic rotor structure including a plurality of radially oriented magnets;
 a second stator structure including two stator rings extended by axially oriented and imbricated teeth; and
 a third fixed collector structure including two flux closing pieces defining at least one measurement gap in which at least one magneto-sensitive element is placed, wherein
 the flux closing pieces and the stator rings define between them a magnetic permeance independent of a relative radial and angular position of both the second stator structure and the third fixed collector structure.

2. The position sensor according to claim 1, wherein the third fixed collector structure includes two angular disk portions configured to effect an axial flux transfer with the stator rings and at least two closure branches allowing offset between faces of the flux closing pieces facing the stator rings and faces of the flux closing pieces delimiting the measurement gap defined by a mathematical relation:

$$\frac{\text{Inter-stator distance}}{\text{Measurement gap}} \geq 4$$

in which the measurement gap is defined by a minimum distance between the faces of the flux closing pieces delimiting the measurement gap and in which the inter-stator distance is defined by a distance between inner faces of the stator rings.

3. The position sensor according to claim 1, wherein the teeth meet a geometric criteria:

$$\frac{Ht \times Lt}{Hi \times e} \geq 5$$

where: Ht is a height of the teeth from an extremity to inner face of one of the rings;
 Lt is an average width of the teeth calculated as an average value of lengths of arcs formed at the extremity and base of the teeth;
 Hi is an imbrication height of the teeth, which is a height over which stators penetrate each other and
 e is a thickness of a metal sheet constituting the teeth.

4. The position sensor according to claim 1, wherein the third fixed collector structure is made of two angular sectors located axially outside of the stator rings configured to conduct flux up to one or more measurement gaps including at least one magneto-sensitive element.

5. The position sensor according to claim 1, wherein a width of the teeth increases from an end to base of the teeth.

6. The position sensor according to claim 1, wherein the third fixed collector structure includes angular sectors whose angular width of an inner edge seen from a sensor axis is equal to a multiple of an angular polar pitch of a magnet.

7. The position sensor according to claim 6, wherein the flux closing pieces include the angular sectors extending over 360°.

8. The position sensor according to claim 1, wherein the measurement gap is configured to receive a single integrated circuit including two magneto-sensitive elements.

9. The position sensor according to claim 6, wherein the magnet has a height substantially equal to a height of the teeth.

10. The position sensor according to claim 1, wherein the two flux closing pieces of the third fixed collector part include straight branches extending axially.

11. The position sensor according to claim 10, wherein one branch exhibits a radial or tangential overlapping of an other branch, in which the at least one magneto-sensitive element is placed.

12. The position sensor according to claim 1, wherein the flux closing pieces are positioned entirely within the stator rings.

\* \* \* \* \*